United States Statutory Invention Registration [19]

[11] Reg. Number: H190

Gutleber [43] Published: Jan. 6, 1987

[54] NOTCH ANTENNA FOR A RADIO COMMUNICATIONS SYSTEM

[75] Inventor: Frank S. Gutleber, Little Silver, N.J.

[73] Assignee: The United States of America as represented by the Secretary of the Army, Washington, D.C.

[21] Appl. No.: 573,908

[22] Filed: Jan. 26, 1984

[51] Int. Cl.[4] ..... G01S 3/24
[52] U.S. Cl. ..... 342/384; 343/841
[58] Field of Search ..... 343/422, 428, 429, 432, 343/841, 381–384, 839, 761

[56] References Cited

U.S. PATENT DOCUMENTS

| | | | |
|---|---|---|---|
| 2,452,106 | 10/1948 | Cotchefer | 343/761 |
| 2,726,389 | 12/1955 | Taylor | 343/761 |
| 2,938,208 | 5/1960 | Pickles et al. | 343/839 |
| 2,979,719 | 4/1961 | Avery et al. | 343/839 |
| 3,130,410 | 4/1964 | Gutleber | 343/844 |
| 3,541,562 | 11/1970 | Dodington et al. | 343/839 |
| 3,594,801 | 7/1971 | Smith | 343/839 |
| 3,605,106 | 9/1971 | Gutleber | 343/844 |
| 4,275,397 | 6/1981 | Gutleber | 343/100 ES |

FOREIGN PATENT DOCUMENTS

| | | | |
|---|---|---|---|
| 1129086 | 8/1982 | Canada | 351/12 |

*Primary Examiner*—Theodore M. Blum
*Assistant Examiner*—Mark Hellner
*Attorney, Agent, or Firm*—Robert P. Gibson; Jeremiah G. Murray; Paul A. Fattibene

[57] ABSTRACT

A notch antenna for the elimination of external interference sources such as jamming, self-interference, atmospheric noise and man made noise is provided by a grounded electrically conductive shield placed in the front of an omnidirectional antenna coupled to radio communications apparatus, such as a receiver, whereby the shield blocks electromagnetic waves arriving within an angular arc defined by the position and size of the shielding element.

9 Claims, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG.1
PRIOR ART
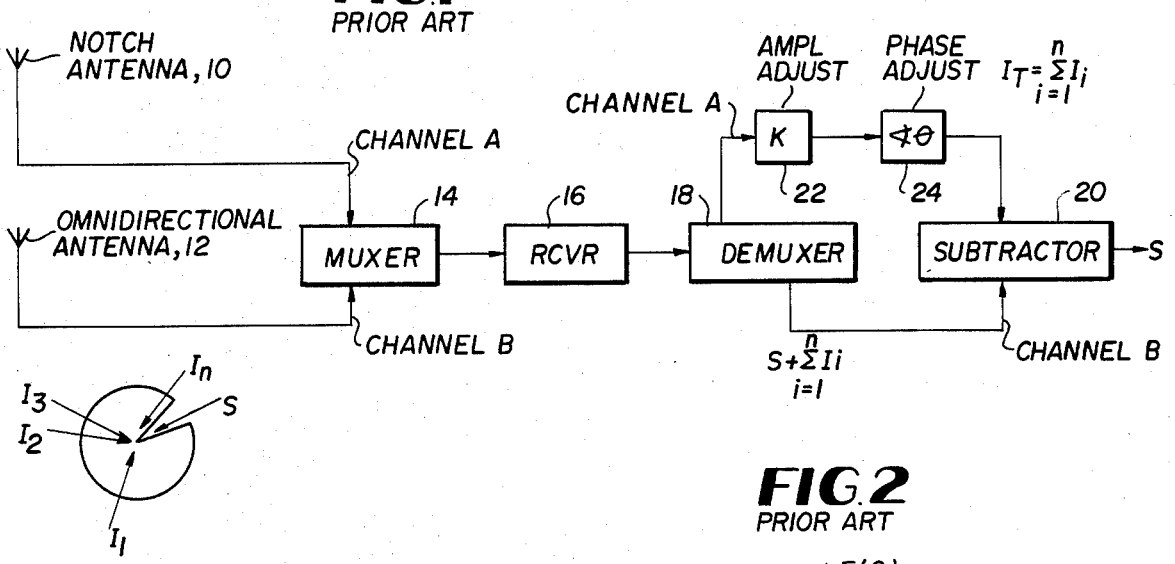
FIG.2
PRIOR ART
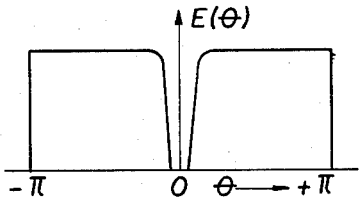
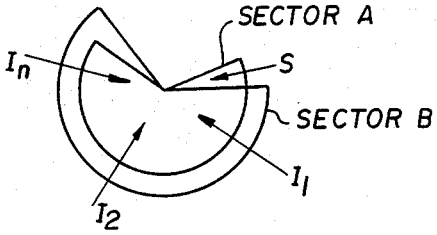
FIG.3
PRIOR ART
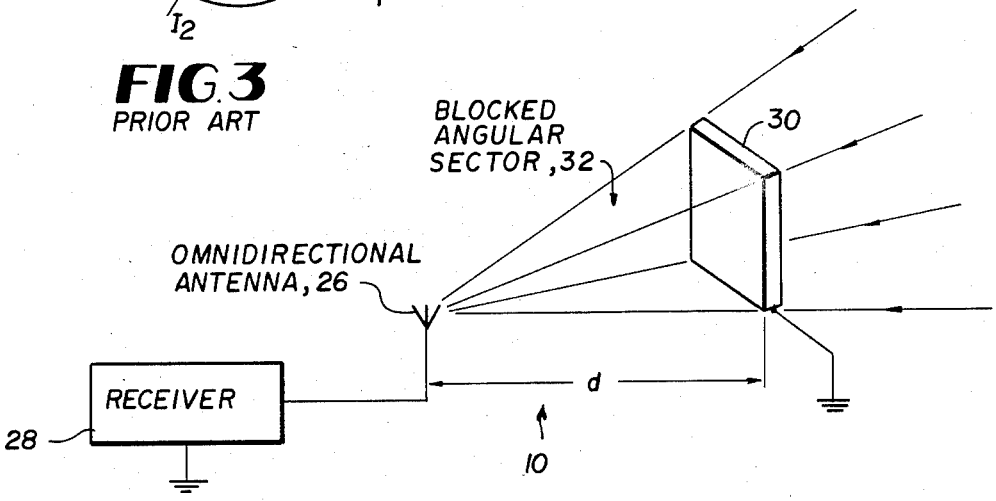
FIG.4

NOTCH ANTENNA FOR A RADIO COMMUNICATIONS SYSTEM

The invention described herein may be manufactured, used and licensed by and for the Government for governmental purposes without the payment to me of any royalties thereon or therefor.

CROSS REFERENCE TO RELATED APPLICATIONS

This invention is related to:

U.S. Ser. No. 526,848 (CECOM D-2025), entitled, "Interference Cancelling Receiver Having High Angular Resolution Intercept Of Transmitted Radiators", filed in the name of Frank S. Gutleber, the present inventor, on Aug. 26, 1983;

U.S. Ser. No. 517,191 (CECOM D-2026), entitled, "Interference Cancelling Transmitter", filed in the name of Frank S. Gutleber, on July 25, 1983; and U.S. Ser. No. 533,089 (CECOM D-2891), entitled, "A Linear Array Antenna Employing The Summation Of Subarrays", filed in the name of Frank S. Gutlebar, on Sept. 19, 1983.

FIELD OF THE INVENTION

This invention relates generally to communications systems and more particularly to radio communications systems in which simple, relatively inexpensive arrangements, are utilized to automatically eliminate or reduce external interference.

BACKGROUND OF THE INVENTION

As is well known and understood, one of the major concerns of designers of antenna systems for communications links is the elimination or reduction of external interference sources such as jamming, self-interference, atmospheric noise, and man made noise. Also as is well known, most arrangements which attempt to resolve these problems of external interference do so in a relatively complex manner, often utilizing very large directional antennas and/or with antennas having hundreds or more elements. This problem of external interference is particularly prevalent in the area of mobile communications systems where omnidirectional antennas are employed because of the large number of users operating in the same frequency band and because of multipath.

A relatively recent approach for eliminating interference in a communications system utilizing a plurality of transmission links is shown and described in U.S. Pat. No. 4,275,397, entitled, "Interference Cancelling Random Access Discrete Address Multiple Access System", which issued to Frank S. Gutleber, the present inventor, on June 23, 1981. The system disclosed therein utilizes orthogonal multiplexing in conjunction with the receiver antenna configuration comprised of an omnidirectional antenna and a notch antenna at the receiving end of the transmission link to cancel interference arriving from all directions except over the narrow beamwidth or null formed by the notch antenna.

As is well known, a notch antenna comprises an antenna having a pattern which contains uniform reception in all directions except for a relatively small angular beamwidth where there is formed a null having a relatively steep slope. General design procedures for providing this type of an antenna pattern have heretofore been described in U.S. Pat. No. 3,130,410, entitled, "Space Coded Linear Array Antenna", F. S. Gutleber, Apr. 21, 1964, and U.S. Pat. No. 3,605,106, entitled, "Slot Fitting Of Code Linear Array Antenna", Frank S. Gutleber, Sept. 14, 1971, and the above referenced related patent application Ser. No. 533,089 (CECOM D-2891), entitled, "A Linear Array Antenna Employing The Summation Of Subarrays". Such patterns are made up of product and/or sums of (sin mx/sin x) functions, and can be achieved by controlling both the amplitudes and spacings of array antenna elements. As a result, the slope of a null in an antenna beam pattern can be made steep, either by providing one or more $(\sin mx/\sin x)^{\nu}$ terms or by appropriate amplitude and phase controls when summing several (sin mx/sin x) functions using subarrays.

An alternative embodiment of a notch antenna can be achieved by utilizing a pair of antenna patterns having a somewhat wide null beamwidth, but where one is angularly displaced by a small amount with respect to the other. The two beams can be positioned so that the desired signal is near the edge of one receiving beam while being nulled out of the second receiving beam.

Accordingly, it is an object of the present invention to eliminate external interference at one end of a transmission link.

Another object of the invention is to provide an antenna whose beamwidth pattern contains uniform reception from all directions except a small angular sector for eliminating external interference at one end of a transmission link.

Still a further object of the invention is to provide a steep notch antenna pattern for application in tactical communications systems employing interference cancellers.

SUMMARY OF THE INVENTION

These and other objects are achieved by the placement of a grounded conductive shield placed in front of an omnidirectional antenna coupled to a communications apparatus whereby the shield blocks electromagnetic waves within an angular arc encompassed by the position and size of the shielding element.

BRIEF DESCRIPTION OF THE DRAWINGS

These and other objects of the present invention will be more readily understood from a consideration of the following description taken in connection with the accompanying drawing in which:

FIG. 1 is a functional block diagram of a multiplexed interference cancelling receiver system of the know prior art;

FIG. 2 is a simplified illustration of a notch antenna pattern known to those skilled in the art;

FIG. 3 is a diagram illustrative of a known method of forming a notch antenna pattern by two overlapping sector antenna patterns; and FIG. 4 is a functional block diagram of a notch antenna in accordance with the subject invention.

DESCRIPTION OF THE PREFERRED EMBODIMENT

Referring now to the drawings and more particularly to FIG. 1, shown therein is a known interference cancelling system which operates to eliminate or substantially reduce interference in a transmission link, and more particularly at the receiving end of the link, by utilizing orthogonal multiplexing in conjunction with a notch antenna, i.e., an antenna which has a single deep null over a small angular beamwidth.

The inset alongside FIG. 1 represents the beam pattern of an almost omnidirectional antenna 10 but one having a narrow notch or nulled out beamwidth, in which "S" represents the desired signal received and "$I_1$", "$I_2$", "$I_3$", . . . "$I_n$" represents external interference signals. The output of the notch antenna 10 in channel A is orthogonally multiplexed with the output of an omnidirectional antenna 12 in channel B, with the multiplexing being of time, frequency, or space so long as the signals from the antennas 10 and 12 are rendered orthogonal or non-interfering with one another. Signals received by the antennas 10 and 12 are coupled to a multiplexer 14, the output of which is then amplified in a receiver 16 and then separated in a demultiplexer 18. A subtractor 20 is coupled to the multiplexer 18, with one input corresponding to the channel B signal which comprises the desired information plus all the interfering signals from the external sources while the other input corresponds to the channel A signal containing all the interfering signals but not the desired signal. This second signal provides a coherent correlated replica of all the interference associated with the signal entering the omnidirectional antenna 12. Additionally, the channel A signal is coupled to the subtractor 20 through amplitude and phase adjusting circuits 22 and 24 to account for any inherent differences in gain and delay in the two orthogonal channels and accordingly the demultiplexed output from the notch antenna 10 is directly subtracted from the demultiplexed output from the omnidirectional antenna 12 to yield a totally interference free signal.

Such an interference cancelling system is disclosed in the aforementioned U.S. Pat. No. 4,275,397, which further indicates that one major advantage of this configuration is that all interference entering the antenna 10 which is outside of the notched beam is virtually eliminated without requiring any complex adaptive processing or requiring a large complex narrow beam antenna which thus makes it desirable for mobile communication usage and for small lightweight tactical communications equipment.

The notch antenna 10, moreover, represents the main element in the interference cancelling system shown in FIG. 1 and introduces different requirements for operation that are normally encountered in typical antenna design. For example, instead of being concerned with a design which forms a directive beam having low side lobes or designing an adaptive system having several movable nulls, one is concerned with providing a fixed pattern which contains uniform reception in all directions except for that in which a narrow beam slot points. Additionally, to be effective the antenna design needs a slope in the pattern developed at the point of the null to be as steep a slope as is practical. Such a pattern is illustratively disclosed in FIG. 2.

As noted above, antenna patterns such as shown in FIG. 2 can be made up of products and/or sums of (sin mx/sin x) functions and can be achieved by controlling both the amplitudes and spacings of antenna elements. As a result, the slope of a null in an antenna beam can be made steep either by providing one or more $(\sin mx/\sin x)^{\nu}$ terms or by appropriate amplitude and phase controls when summing several (sin mx/sin x) functions using subarrays in accordance with the teachings of U.S. Pat. Nos. 3,130,410 and 3,605,106.

Alternatively, and as shown, a notch antenna that can be used with FIG. 1 and one having a steep slope but with a somewhat wider null beamwidth is shown in FIG. 3. Such an antenna pattern can be electronically scanned to provide a second received beam which is angularly displaced by a small amount. Accordingly, two beam patterns illustrated as sector A and sector B are positioned so that the desired signal "S" lies near the edge of one receiving beam (sector A) while being nulled out of the second receiving beam (sector B). Although this type of configuration continues to null out the interference sources $I_1, I_2, \ldots I_n$, it does introduce a sector, namely sector B, which is vulnerable to interference. However, the beamwidth of sector A wherein the desired signal S is being received, can be made very small. Such an approach is useful where it is found to be more practical to design an array antenna with a steeper slope and a wider notch beamwidth than that as illustrated in FIG. 2.

Referring now to FIG. 4, disclosed thereat is a functional block diagram of the present invention and one disclosing the use of a single simple omnidirectional antenna with a grounded shield of appropriate size. As shown in FIG. 4, an omnidirectional receiving antenna 26 is coupled to a communications receiver 28. In spaced positional relationship with the omnidirectional antenna 26 is an electrically conductive electromagnetic shield 30 which is grounded along with the receiver 28. The shielding element 30 is placed in front of the antenna 26 and operates to block electromagnetic waves arriving from an external source by defining a blocking sector 32 whose angular arc is determined by the distance (d) away from the omnidirectional antenna 26 and the size of the shielding element 30. Thus the shield 30 acts as an obstacle to radio signals and by varying its height, width and position relative to the antenna element 26 totally blocks reception over some small angular arc. While such an arrangement is particularly desirable for small lightweight tactical communications equipment, it can, when desired, be utilized to a large advantage in any communications link where it is necessary to eliminate external interference which includes not only interfering signals from a jammer, atmospheric noise and man made noise, but even acoustical noise. In the latter instance where acoustic noise is objected to, the shielding element 30 would be comprised of material which absorbs sound waves.

A typical example of utilization of a configuration as shown in FIG. 4 would involve long range HF communication links where the input atmospheric noise is external to the antenna. In this case, there exists the possibility of enhancing the received signal to noise ratio by more than 10 db. This would more than justify the modest increase in complexity associated with employing a notch antenna in a second multiplexed channel such as shown in FIG. 1. In applications involving anti-jam operation, all the jamming entering the antenna outside of the notched beam is virtually eliminated without requiring complex adaptive processing or a large complex narrow beam antenna.

Having thus shown and described what is considered to be the preferred embodiment of the invention, it will be readily apparent that modifications may be resorted to by those skilled in the art without departing from the spirit and scope of the invention as defined in the appended claims. Accordingly, all alterations, substitutions, and changes coming within the spirit and scope of the invention are herein meant to be included.

I claim:

1. An antenna system having a notch type antenna pattern coupled to radio communications apparatus, comprising:

antenna means having an omnidirectional antenna beam pattern; and a shield of a predetermined size and shape located a predetermined distance away from said antenna means and capable of being selectively positioned for a predetermined azimuth and elevation so that energy of a selected type is blocked within a relatively small angular sector.

2. The antenna system as defined by claim 1 wherein said shield comprises an electromagnetic wave shield.

3. The antenna system as defined by claim 1 wherein said shield comprises an electrically conductive shield of radio signals.

4. The antenna system of claim 3 wherein said shield is connected to a point of reference potential and operates to block electromagnetic waves within an angular arc encompassed by the size, shape and position of said shield.

5. The antenna system of claim 1 wherein said shield comprises a grounded electrically conductive shield of electromagnetic waves.

6. The antenna system as defined by claim 5 wherein said antenna means comprises a receiving antenna, and said radio communications apparatus comprises a radio receiver.

7. In a signal communications system:

first means for generating a single first antenna beam pattern to provide a signal return from a desired signal source accompanied by all undesired interference returns arriving from a plurality of interference sources from any direction except for a narrow sector;

second means for generating a single second antenna beam pattern to provide from all of said interference sources a coherent correlated replica of all said undesired interference returns provided by said first antenna beam pattern unaccompanied by said desired signal source;

third means coupled to said first and second means for subtracting the returns provided by said first and second antenna beam patterns to produce substantially only said desired signal return as an output of said system;

wherein said first means includes a first onmidirectional antenna; and wherein said second means includes a second omnidirectional antenna and an electromagnetic wave shield of a predetermined size and shape located a predetermined distance away from said second omnidirectional antenna and capable of being selectively positioned for a predetermined azimuth and elevation for blocking signals arriving within a relatively small angular sector defined by said shield in its position relative to said second omnidirectional antenna and providing thereby an antenna having a notch beam pattern.

8. The communications system as defined by claim 7 wherein said shield comprises an electrically conductive shield coupled to a point of reference potential.

9. The communications system as defined by claim 7 wherein said shield comprises an electrically conductive shield element connected to ground potential.

* * * * *